US008860338B2

(12) United States Patent
Shimazaki et al.

(10) Patent No.: US 8,860,338 B2
(45) Date of Patent: Oct. 14, 2014

(54) SELECTION CIRCUIT WITH DIGITAL FILTER FOR VCM

(75) Inventors: Tsutomu Shimazaki, Oizumi-Machi (JP); Akira Suzuki, Oizumi-Machi (JP); Takeshi Arai, Oizumi-Machi (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 686 days.

(21) Appl. No.: 13/158,009

(22) Filed: Jun. 10, 2011

(65) Prior Publication Data

US 2011/0304285 A1 Dec. 15, 2011

(30) Foreign Application Priority Data

Jun. 11, 2010 (JP) ................................. 2010-134343

(51) Int. Cl.
*H02K 41/00* (2006.01)
*H02P 1/00* (2006.01)
*H02P 3/00* (2006.01)
*H02P 25/02* (2006.01)

(52) U.S. Cl.
CPC .................................. *H02P 25/028* (2013.01)
USPC .......................................... 318/135; 318/637

(58) Field of Classification Search
CPC ............ H02P 25/208; G11B 20/10037; G11B 20/10046
USPC .................................................. 318/135, 637
See application file for complete search history.

(56) References Cited

U.S. PATENT DOCUMENTS

| 5,325,247 | A  | * | 6/1994 | Ehrlich et al. ............. 360/78.09 |
| 6,188,191 | B1 | * | 2/2001 | Frees et al. .................... 318/560 |
| 6,707,269 | B2 | * | 3/2004 | Tieu .............................. 318/592 |
| 7,209,311 | B2 | * | 4/2007 | Ueda et al. ................. 360/77.06 |
| 2005/0111125 | A1 | | 5/2005 | Chung |

FOREIGN PATENT DOCUMENTS

| JP | 05159492 A | 6/1993 |
| JP | 10-255419 A | 9/1998 |
| JP | 2008-178206 A | 7/2008 |
| KR | 2005-0045198 A | 5/2005 |

OTHER PUBLICATIONS

Office Action issued in corresponding Korean Application No. 10-2011-56402 dated Jul. 13, 2012 and English translation thereof (11 pages).
Patent Abstract for Japanese Publication No. 2008-178206 Published Jul. 31, 2008 (1 page).

* cited by examiner

*Primary Examiner* — Erick Glass
(74) *Attorney, Agent, or Firm* — Rennie W. Dover

(57) ABSTRACT

A motor drive circuit includes: a digital filter configured to attenuate amplitude in a frequency band including a resonance frequency of an actuator in a target current signal, the target current signal being a digital signal indicative of a target value of a drive current, the drive current being supplied to a voice coil motor configured to drive the actuator; a digital-analog converter configured to convert an output signal of the digital filter into an analog signal, and output the converted analog signal as a current control signal; and a drive circuit configured to supply the drive current to the voice coil motor according to the current control signal.

20 Claims, 5 Drawing Sheets

SELECTION CIRCUIT WITH DIGITAL FILTER FOR VCM

CROSS-REFERENCE TO RELATED APPLICATION

This application claims the benefit of priority to Japanese Patent Application No. 2010-134343, filed Jun. 11, 2010, of which full contents are incorporated herein by reference.

BACKGROUND OF THE INVENTION

1. Field of the Invention

The present invention relates to a motor drive circuit.

2. Description of the Related Art

With respect to a linear motor that drives an actuator for performing positioning of a magnetic head of a hard disc drive, a voice coil motor is generally known that produces thrust by passing an electric current through a coil in a magnetic field of a permanent magnet. Recently, there have been portable terminals such as cellular phones and notebook personal computers equipped with camera modules in which the voice coil motors may be used to perform auto-focusing control and optical zoom control in order to reduce the sizes of the modules.

For example, Japanese Patent Laid-Open Publication No. 2008-178206 discloses an actuator drive device capable of reducing vibration of a moving part by changing a drive current of the voice coil motor at a certain gradient in a time period which is a substantially natural-number multiple of the natural frequency period of the moving part.

As such, the position of the moving part of the actuator can swiftly be stabilized by supplying to the voice coil motor the drive current having a ramp waveform which changes at a certain gradient.

The natural frequency period, however, varies by the configuration of the actuator, and the actuator drive device of Japanese Patent Laid-Open Publication No. 2008-178206 requires that the time period in which the drive current is ramped up should be set longer as the natural frequency (resonance frequency) becomes lower.

For this reason, the convergence time, in which the vibration of the actuator has converged and the position of the moving part has been stabilized, may become longer, so that the response speed required for the module to be used may not be satisfied.

SUMMARY OF THE INVENTION

A motor drive circuit according to an aspect of the present invention, includes: a digital filter configured to attenuate amplitude in a frequency band including a resonance frequency of an actuator in a target current signal, the target current signal being a digital signal indicative of a target value of a drive current, the drive current being supplied to a voice coil motor configured to drive the actuator; a digital-analog converter configured to convert an output signal of the digital filter into an analog signal, and output the converted analog signal as a current control signal; and a drive circuit configured to supply the drive current to the voice coil motor according to the current control signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<Configuration of Motor Drive Circuit>

A configuration will now be described of a motor drive circuit according to one embodiment of the present invention with reference to FIG. 1.

Figure 1:
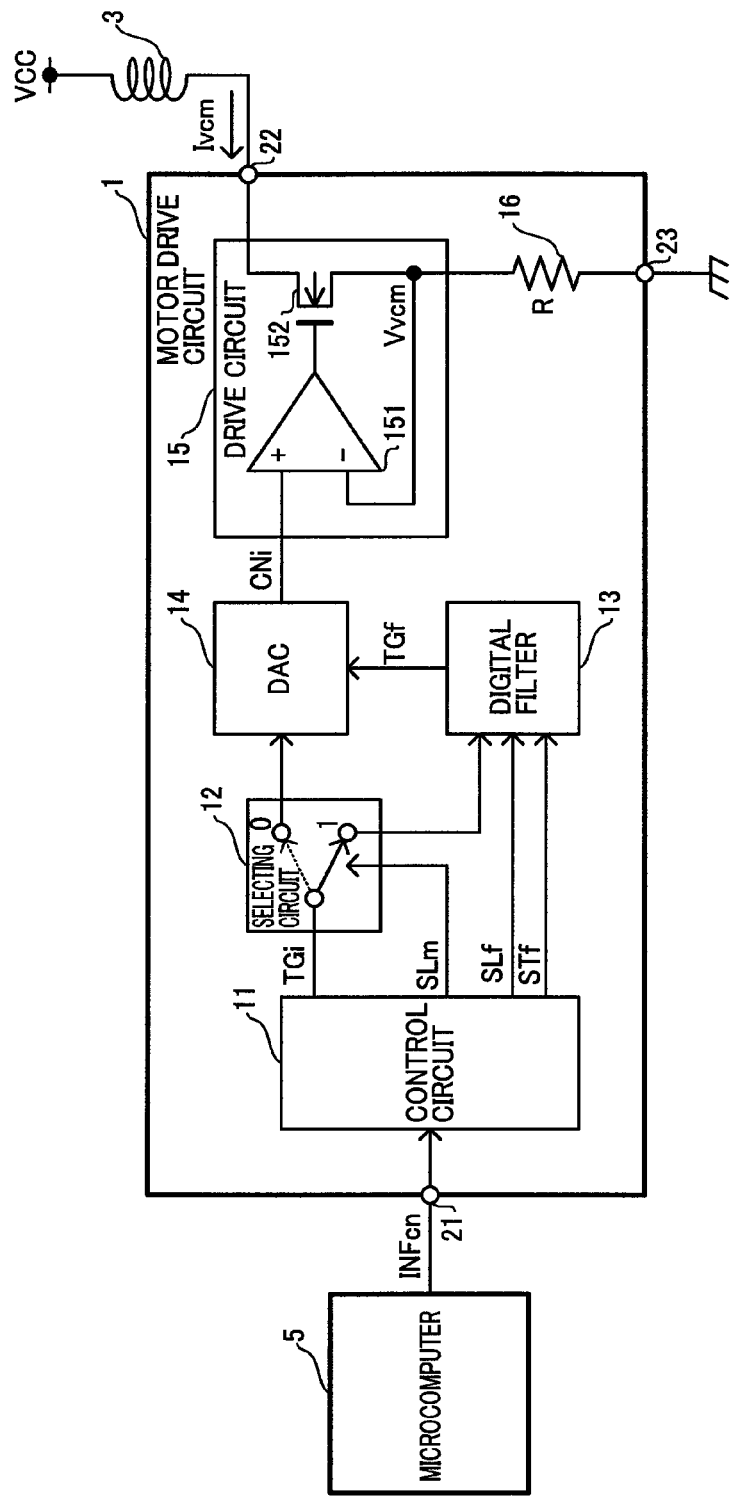
FIG. 1 is a circuit block diagram illustrating a configuration of a motor drive circuit according to one embodiment of the present invention.

A motor drive circuit 1 shown in FIG. 1 is a circuit configured to supply a drive current Ivcm to a voice coil motor 3 which drives an actuator, under control of a microcomputer 5, and is configured as an integrated circuit provided with terminals 21 to 23. The motor drive circuit 1 includes a control circuit 11, a selecting circuit 12, a digital filter 13, a DAC (Digital-Analog Converter) 14, a drive circuit 15, and a resistor 16. The resistor 16 may be externally connected to the terminal 23. The motor drive circuit 1 should preferably be formed in an integrated manner on a semiconductor substrate.

Control information INFcn is inputted to the control circuit 11 from the microcomputer 5 via the terminal 21. The control circuit 11 outputs a target current signal TGi, a mode selection signal SLm, filter selection information SLf, and frequency setting information STf.

The selecting circuit 12 is configured as a 1-input, 2-output multiplexer, and the mode selection signal SLm is inputted to a selection control input thereof. The target current signal TGi is inputted to a data input thereof. The target current signal TGi is inputted to the DAC 14 and the digital filter 13 from the outputs corresponding to SLm=0 and 1, respectively.

The filter selection information SLf and the frequency setting information STf in addition to the target current signal TGi are inputted to the digital filter 13. The digital filter 13 outputs a (filtered) target current signal TGf. The target current signals TGi and TGf are inputted to the DAC 14, and the DAC 14 outputs a current control signal CNi.

The drive circuit 15 includes, for example, an operational amplifier 151 and an NMOS (N-channel Metal-Oxide Semiconductor) transistor 152. The current control signal CNi is inputted to a non-inverting input of the operational amplifier 151, and an inverting input thereof is connected to the source of the NMOS transistor 152. Further, the NMOS transistor 152 has its drain connected to the terminal 22, and has its source connected to the terminal 23 via the resistor 16, and the output signal of the operational amplifier 151 is inputted to its gate. The terminal 22 is connected to the voice coil motor 3 whose one end is connected to a source potential VCC, and the terminal 23 is connected to a ground potential.

<Operation of Motor Drive Circuit>

Operation will then be described of the motor drive circuit according to an embodiment of the present invention.

The control circuit 11 outputs the target current signal TGi, the mode selection signal SLm, the filter selection information SLf, and the frequency setting information STf, based on the control information INFcn which is inputted from the microcomputer 5.

The target current signal TGi is a digital signal indicative of a target value of the drive current Ivcm which is supplied to the voice coil motor 3. The mode selection signal SLm is a signal for selecting a measurement mode (first mode) or a control mode (second mode) which will be described later. It is assumed that the mode selection signal SLm indicates the measurement mode when SLm=0 and indicates the control mode when SLm=1.

Further, the filter selection information SLf and the frequency setting information STf are information for setting characteristics of the digital filter 13. Specifically, the filter selection information SLf is information for selecting one among a plurality of filters included in the digital filter 13. On the other hand, the frequency setting information STf is information for setting a frequency band which is to be attenuated by the digital filter 13.

The selecting circuit 12 supplies the target current signal TGi inputted from the control circuit 11 to the DAC 14 when SLm=0 (measurement mode) and to the digital filter 13 when SLm=1 (control mode). The digital filter 13 attenuates the frequency band, which is set by the frequency setting information STf, in the target current signal TGi, and outputs the (filtered) target current signal TGf.

The DAC 14 converts the target current signal TGi (when SLm=0) or TGf (when SLm=1) into an analog signal, and generates the current control signal CNi. The operational amplifier 151 compares the voltage of the current control signal CNi and a voltage Vvcm at a connection point of the NMOS transistor 152 and the resistor 16, and further, the gate voltage of the NMOS transistor 152 changes according to the result of such comparison.

If a resistance value of the resistor 16 is given as R, then the drive current Ivcm is detected as the voltage Vvcm=Ivcm×R. Therefore, the drive circuit 15 controls the voltage Vvcm so as to become equal to the voltage of the current control signal CNi, and the current value of the drive current Ivcm is controlled so as to reach the current value indicated by the current control signal CNi.

As such, the motor drive circuit 1 converts the target current signal TGi in the measurement mode and the target current signal TGf in the control mode into the analog signal, so as to generate the current control signal CNi, and supplies the drive current Ivcm to the voice coil motor 3 according to the current control signal CNi.

<Specific Example of Operation of Motor Drive Circuit and Actuator>

A specific example will now be described of an operation of the motor drive circuit and the actuator in the measurement mode and the control mode.

The operation in the measurement mode will firstly be described with reference to FIG. 2. The measurement mode is a mode of measuring a resonance frequency fc of the actuator which is driven by the voice coil motor 3.

In the measurement mode, the control circuit 11 outputs a step signal as the target current signal TGi, based on the control information INFcn. The target current signal TGi is supplied to the DAC 14 via the selecting circuit 12, and is converted into the analog signal. Therefore, the voltage of the current control signal CNi changes in a step-like manner as shown by a short dashed line in FIG. 2.

Figure 2:
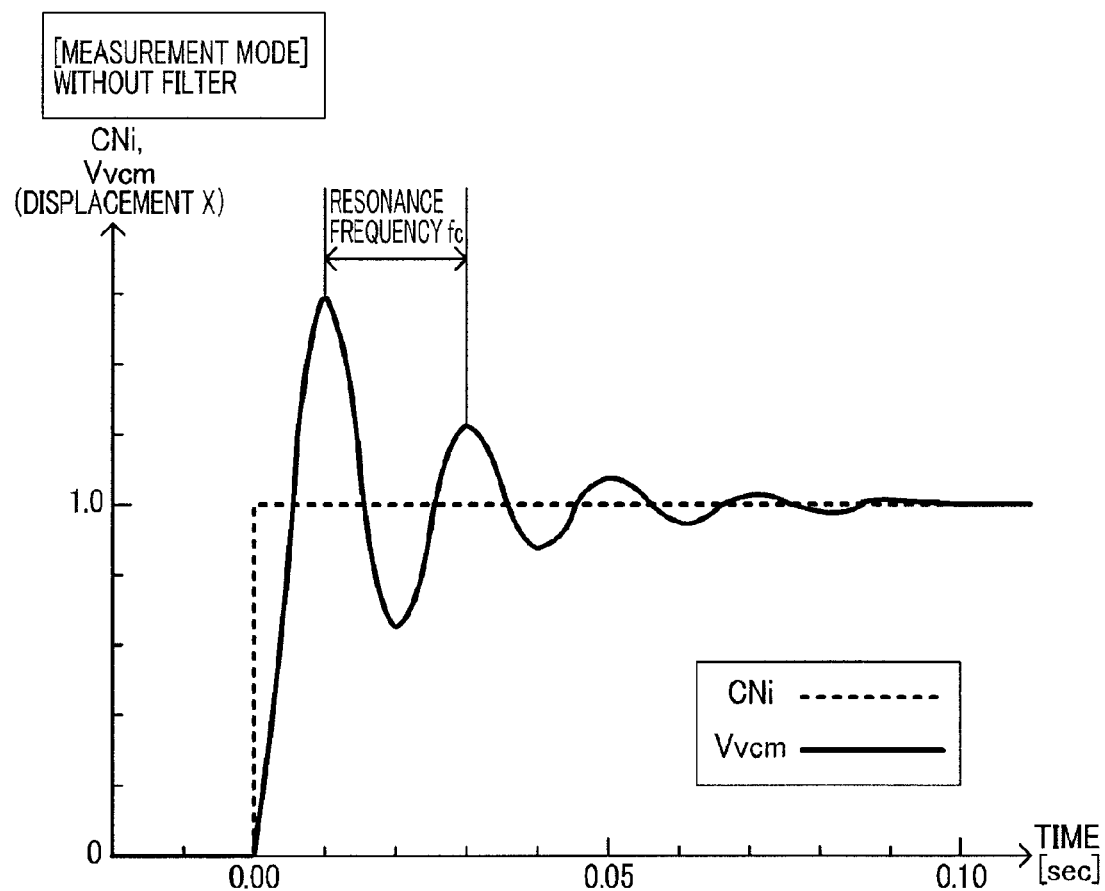
FIG. 2 is a schematic diagram illustrating one example of a relationship of a current control signal CNi and a voltage Vvcm in a measurement mode.

In this case, though the drive circuit 15 controls the voltage Vvcm so as to become equal to a step voltage of the current control signal CNi, an inertial force of the moving part of the actuator and resilience of a spring cause the voltage Vvcm to oscillate and gradually converge as shown by a solid line in FIG. 2. The actuator vibrates similarly and displacement x of the moving part gradually converges on a target position which corresponds to the target current signal TGi. The resonance frequency fc can be obtained by measuring the displacement x and performing a spectral analysis of the measured data. The resonance frequency fc may be obtained from the data of measurement of the drive current Ivcm or the voltage Vvcm.

The operation in the control mode will then be described referring appropriately to FIGS. 3 to 7. The control mode is a mode of driving the actuator under control of the microcomputer 5.

In the control mode, the control circuit 11 outputs the target current signal TGi that changes in a step-like manner according to the target position of the moving part of the actuator, based on the control information INFcn. In the following, a description will be given of the case where the same step signal as that in the measurement mode is outputted as the target current signal TGi for the purpose of comparison with the case of the operation in the measurement mode.

The target current signal TGi is supplied to the DAC 14 as the target current signal TGf via the selecting circuit 12 and the digital filter 13, and is converted into the analog signal. Therefore, in the control mode, the drive circuit 15 supplies the drive current Ivcm to the voice coil motor 3 according to the current control signal CNi filtered by the digital filter 13.

A notch filter, a low-pass filter, etc., are used as the digital filter 13. In an embodiment of the present invention, by way of example, the digital filter 13 includes notch filters and low-pass filters with different characteristics and selects one among them according to the filter selection information SLf. Further, the digital filter 13 sets the frequency band to be attenuated, based on the frequency setting information STf corresponding to the resonance frequency fc which is measured in advance in the measurement mode.

Figure 3:
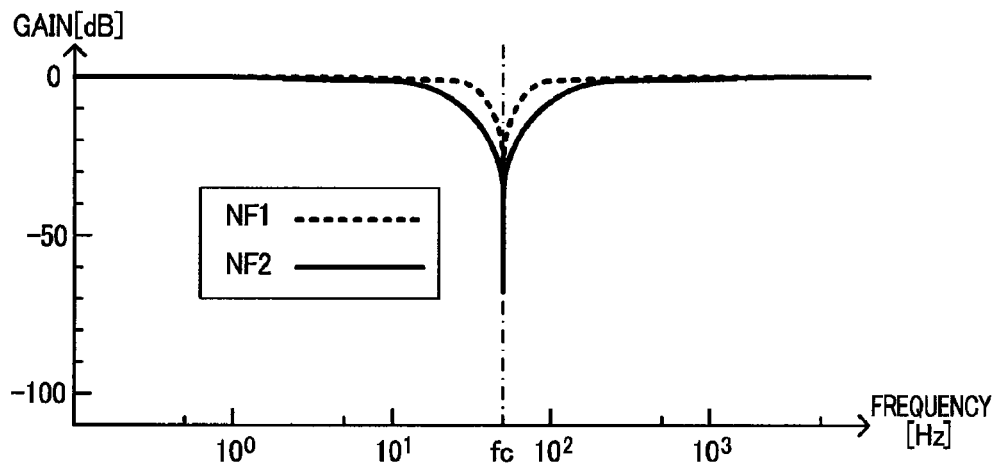
FIG. 3 is a schematic diagram illustrating examples of a notch filter to be used for a digital filter 13 in a control mode.

FIG. 3 denotes one example of the frequency characteristics of two notch filters NF1 (short dashed line) and NF2 (solid line) included in the digital filter 13. The notch filters NF1 and NF2 attenuate the frequency band around the resonance frequency fc, and have notch widths and notch depths different from each other.

Figure 4:
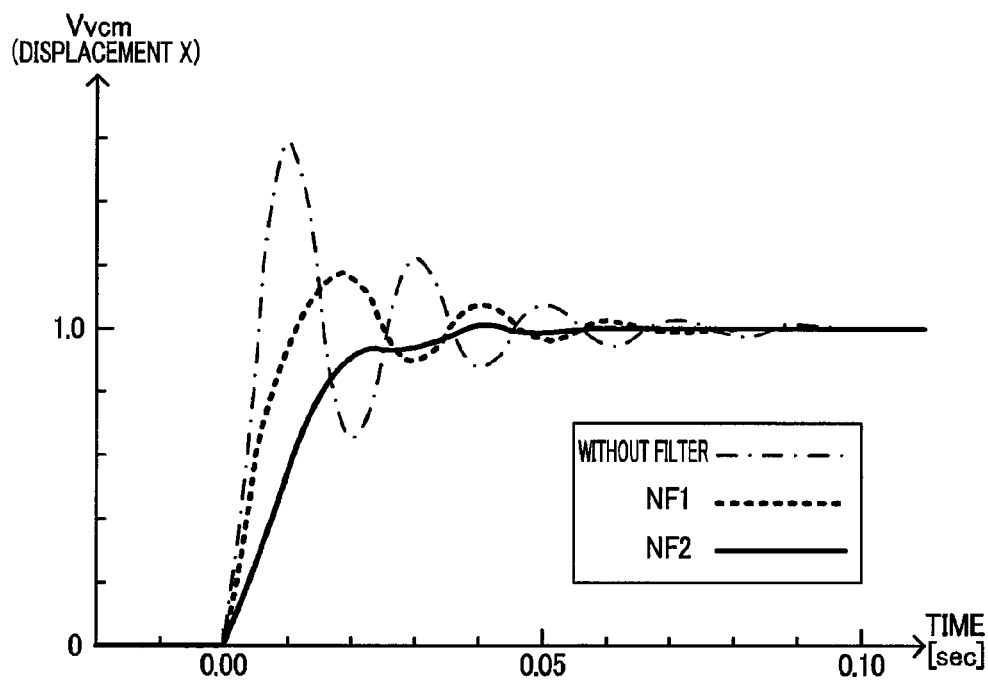
FIG. 4 is a schematic diagram illustrating one example of a voltage Vvcm in the case where notch filters shown in FIG. 3 are used.

FIG. 4 denotes one example of the voltage Vvcm in the case where the notch filters NF1 (short dashed line) and NF2 (solid line) are used. In FIG. 4, the voltage Vvcm in the measurement mode (solid line of FIG. 2) is shown by a chain line for comparison. Therefore, the vibration of the actuator has been suppressed and the convergence time in which the vibration has converged is shortened by filtering the target current signal TGi using the notch filter NF1 or NF2.

Figure 5:
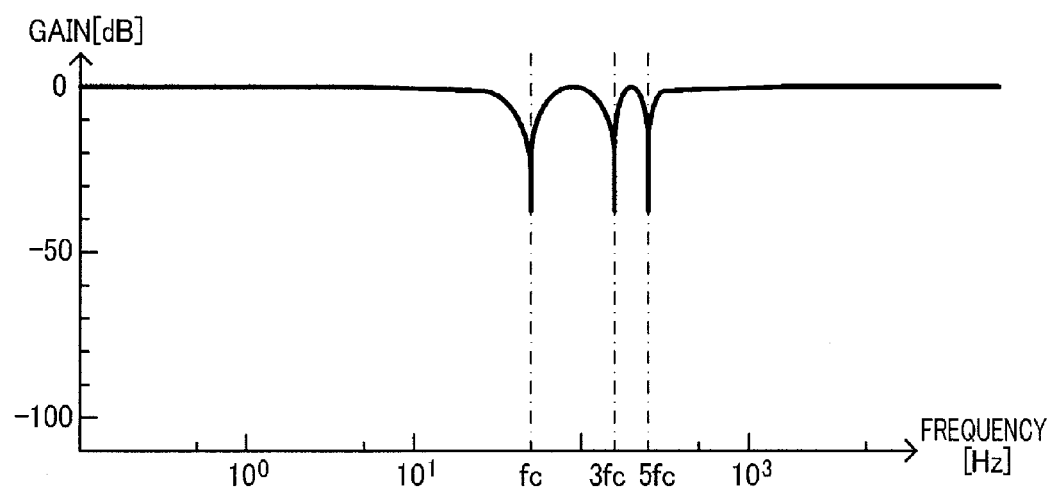
FIG. 5 is a schematic diagram illustrating another example of a notch filter to be used for a digital filter 13.

The vibration in such a step response as shown in FIG. 2 includes, besides the resonance frequency fc, frequency components of an odd multiple thereof. Therefore, the convergence time may be further shortened by further suppressing the vibration of the actuator using the notch filter that attenuates the frequency bands around 3 fc and 5 fc in addition to the resonance frequency fc as shown in FIG. 5, for example.

Figure 6:
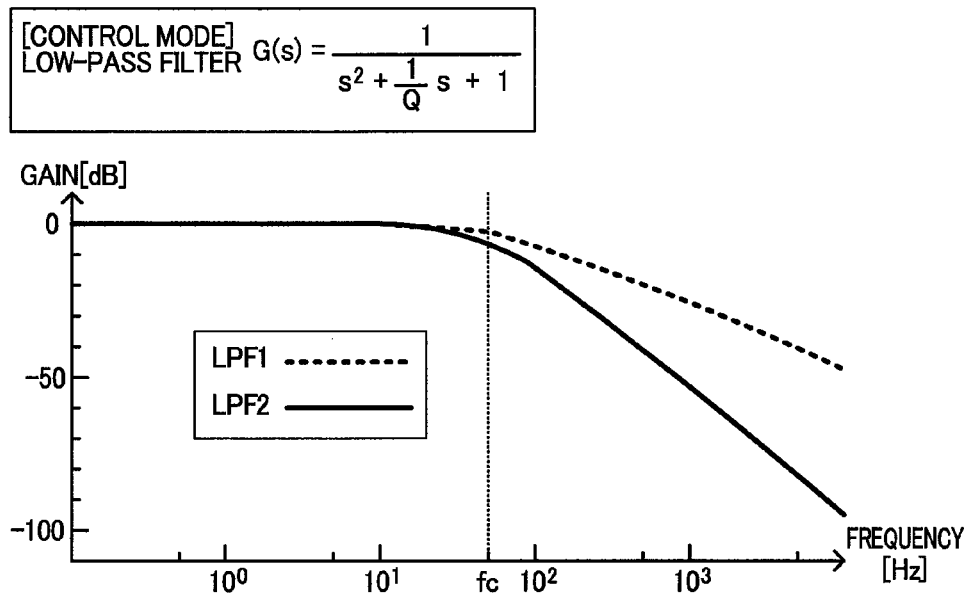
FIG. 6 is a schematic diagram illustrating examples of a low-pass filter to be used for a digital filter 13 in a control mode.

FIG. 6 denotes one example of the frequency characteristics of the low-pass filters LPF1 (short dashed line) and LPF2 (solid line) included in the digital filter 13. The low-pass filters LPF1 and LPF2 both take the resonance frequency fc as the cut-off frequency and the LPF2 is configured with the LPF1s 2-stage-cascade-connected.

Figure 7:
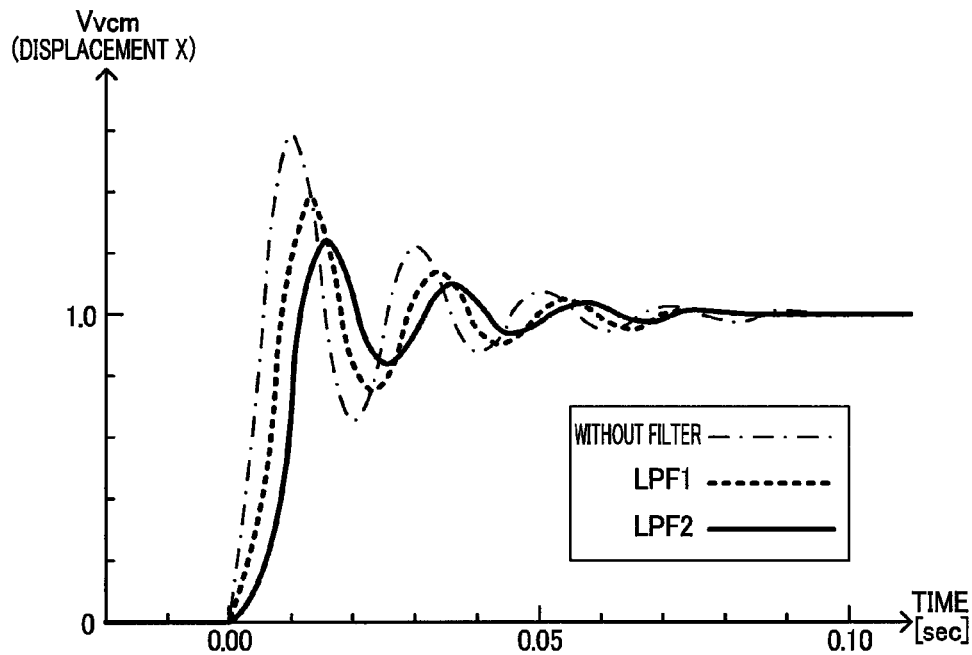
FIG. 7 is a schematic diagram illustrating one example of a voltage Vvcm in the case where low-pass filters shown in FIG. 6 are used.

FIG. 7 denotes one example of the voltage Vvcm in the measurement mode (chain line) and the voltage Vvcm in the case where the low-pass filters LPF1 (short dashed line) and LPF2 (solid line) are used. Therefore, the target current signal TGi is filtered by the low-pass filter LPF1 or LPF2, so that the vibration of the actuator is suppressed and the convergence time in which the vibration has converged is shortened.

The convergence time is more shortened using the notch filter than that using the low-pass filter. On the other hand, while the notch filter is a second-order filter, the low-pass filter can also be configured as a first-order filter.

As described above, in the motor drive circuit 1, the frequency band including the resonance frequency fc of the actuator in the target current signal TGi is attenuated using the digital filter 13, and the drive current Ivcm is supplied to the voice coil motor 3 according to the filtered current control signal CNi, so that the convergence time in which the vibration has been converged can be shortened irrespective of the resonance frequency of the actuator.

In the measurement mode, the step signal is supplied as the target current signal TGi to the DAC 14 and the resonance frequency fc of the vibration in the step response is measured in advance, so that the frequency band to be attenuated by the digital filter 13 can be set according to the measured resonance frequency fc in the control mode.

The notch filter or the low-pass filter is used as the digital filter 13, so that the frequency band including the resonance frequency fc of the actuator in the target current signal TGi can be attenuated.

The digital filter 13 includes a plurality of notch filters or low-pass filters, so that the filter with optimal characteristics can be selected and used for each actuator.

When the notch filter is used as the digital filter 13, the resonance frequency fc and the frequency components of odd multiples thereof are attenuated, so that the convergence time can be further shortened.

While, in an embodiment as described above, the drive circuit 15 causes the NMOS transistor 152 to control the drive current Ivcm, the drive circuit is not limited thereto. The drive circuit of the motor drive circuit 1 can use a PMOS (P-channel MOS) transistor and can be configured such that the source potential VCC and the ground potential have their polarities inverted relative to the drive circuit 15 shown in FIG. 1.

While, in an embodiment as described above, the resonance frequency fc of the actuator which is driven by the voice coil motor 3 is measured in the measurement mode, an embodiment according to the present invention is not limited thereto and may not be required to have the measurement mode.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit comprising:
    a digital filter configured to attenuate amplitude in a frequency band including a resonance frequency of an actuator in a target current signal, the target current signal being a digital signal indicative of a target value of a drive current, the drive current being supplied to a voice coil motor configured to drive the actuator;
    a digital-analog converter configured to convert an output signal of the digital filter into an analog signal, and output the converted analog signal as a current control signal;
    a drive circuit configured to supply the drive current to the voice coil motor according to the current control signal; and
    a selecting circuit configured to select either a first mode, in which a step signal is inputted as the target current signal and the step signal is supplied to the digital-analog converter, or a second mode, in which the inputted target current signal is supplied to the digital filter, according to a mode selection signal, wherein in the first mode, the digital-analog converter converts the step signal into the analog signal, and outputs the converted analog signal as the current control signal, and wherein in the second mode, the digital filter has the frequency band to be attenuated in amplitude set therefor according to the resonance frequency measured in advance in the first mode.

2. The motor drive circuit of claim 1, wherein the digital filter includes a notch filter or a low-pass filter, the notch filter configured to attenuate amplitude in the frequency band around the resonance frequency, the low-pass filter configured to attenuate amplitude in the frequency band higher than or equal to the resonance frequency.

3. The motor drive circuit of claim 2, wherein the notch filter further attenuates amplitude in the frequency bands around the frequencies that are odd multiples of the resonance frequency.

4. The motor drive circuit of claim 3, wherein at least the digital filter, the digital-analog converter, and the drive circuit are formed in an integrated manner on one semiconductor substrate.

5. The motor drive circuit of claim 2, wherein at least the digital filter, the digital-analog converter, and the drive circuit are formed in an integrated manner on one semiconductor substrate.

6. The motor drive circuit of claim 1, further comprising:
    a control circuit configured to supply the target current signal and the mode selection signal to the selecting circuit, based on control information to be inputted to the control circuit, wherein the digital filter includes a notch filter configured to attenuate amplitude in the frequency band around the resonance frequency, or a low-pass filter configured to attenuate amplitude in the frequency band higher than or equal to the resonance frequency, and wherein based on the control information, the control circuit supplies to the digital filter:
    filter selection information for selecting one among a plurality of filters included in the digital filter; and
    frequency setting information for setting the frequency band in which amplitude is to be attenuated.

7. The motor drive circuit of claim 6, wherein the notch filter further attenuates amplitude in the frequency bands around the frequencies that are odd multiples of the resonance frequency.

8. The motor drive circuit of claim 7, wherein at least the digital filter, the digital-analog converter, and the drive circuit are formed in an integrated manner on one semiconductor substrate.

9. The motor drive circuit of claim 6, wherein at least the digital filter, the digital-analog converter, and the drive circuit are formed in an integrated manner on one semiconductor substrate.

10. The motor drive circuit of claim 1, wherein the digital filter includes a notch filter configured to attenuate amplitude in the frequency band around the resonance frequency, wherein the notch filter further attenuates amplitude in the frequency bands around the frequencies that are odd multiples of the resonance frequency.

11. The motor drive circuit of claim 10, wherein at least the digital filter, the digital-analog converter, and the drive circuit are formed in an integrated manner on one semiconductor substrate.

12. The motor drive circuit of claim 1, wherein at least the digital filter, the digital-analog converter, and the drive circuit are formed in an integrated manner on one semiconductor substrate.

13. A motor drive circuit, comprising:
a digital filter configured to attenuate amplitude in a frequency band including a resonance frequency of an actuator in a target current signal, the target current signal being a digital signal indicative of a target value of a drive current, the drive current being supplied to a voice coil motor configured to drive the actuator, wherein the digital filter includes a low-pass filter configured to attenuate amplitude in the frequency band higher than or equal to the resonance frequency; and
a digital-analog converter configured to convert an output signal of the digital filter into an analog signal, and output the converted analog signal as a current control signal; and a drive circuit configured to supply the drive current to the voice coil motor according to the current control signal.

14. The motor drive circuit of claim 13, wherein at least the digital filter, the digital-analog converter, and the drive circuit are formed in an integrated manner on one semiconductor substrate.

15. A motor drive circuit, comprising:
a control circuit having an input coupled for receiving a control signal and a plurality of outputs;
a selecting circuit having first and second inputs and first and second outputs, the first and second inputs of the selecting circuit coupled to first and second outputs of the plurality of outputs of the control circuit, respectively;
a digital filter having a first input coupled to the first output of the selecting circuit, the digital filter configured to attenuate amplitude in a frequency band including a resonance frequency of an actuator in a target current signal; and
a digital-to-analog converter having a first input, a second input, and an output, the first input coupled to the second output of the selecting circuit and the second input coupled to the output of the digital filter.

16. The motor drive circuit of claim 15, further including a drive circuit having first and second inputs and an output, the first input coupled to the output of the digital-to-analog converter.

17. The motor drive circuit of claim 16, wherein the drive circuit comprises:
an amplifier having an inverting input, a noninverting input, and an output; and
a transistor having a control terminal and first and second current carrying terminals, the control terminal coupled to the output of the amplifier, the first current carrying terminal coupled to the inverting input of the amplifier, and the second current carrying terminal configured to serve as the output of the drive circuit.

18. The motor drive circuit of claim 17, further including a resistor coupled to the inverting input of the amplifier and to the first current carrying terminal of the transistor.

19. The motor drive circuit of claim 16, wherein the control circuit is configured to:
supply a target current signal at the first output of the plurality of outputs of the control circuit, the target current signal indicative of a target value of a drive current at the output of the drive circuit;
supply a mode selection signal for selecting operation in a measurement mode or a control mode at the second output of the plurality of outputs of the control circuit;
supply filter setting information at a third output of the plurality of outputs of the control circuit; and
supply frequency setting information at a fourth output of the plurality of outputs of the control circuit.

20. The motor drive circuit of claim 15, wherein the digital filter comprises a notch filter.

* * * * *